United States Patent Office 3,351,680
Patented Nov. 7, 1967

3,351,680
O,O - DILOWERALKYL PHOSPHORODITHIOYL-METHYL-SUBSTITUTED MERCAPTOACETATES
Arnold D. Gutman, Oakland, and Jack P. Orr, Mountain View, Calif., assignors to Stauffer Chemical Company, New York, N.Y., a corporation of Delaware
No Drawing. Filed Mar. 1, 1965, Ser. No. 436,343
6 Claims. (Cl. 260—948)

This invention relates to certain new and novel phosphate ester sulfides and their use as insecticides and acaricides. The compounds are particularly valuable for their pesticidal properties. More specifically, this invention relates to compounds of the general formula

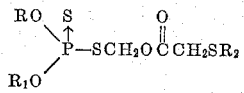

wherein R and $R_1$ are lower alkyl radicals and $R_2$ is a member selected from the group consisting of alkyl radicals containing from 1 to 8 carbon atoms, inclusive, and phenyl. Also included is a method of preparing, using and applying said compositions.

This new compounds of this invention are prepared by the reaction of an appropriate alkali metal thiolate with an O,O - disubstituted phosphorodithioyl-methylchloroacetate in a neutral solution in an organic solvent. The compounds may also be prepared by the reaction of a substituted mercaptoacetylchloride and a hydroxy-methyl-O,O-disubstituted-phosphorodithioate in an organic solvent, such as benzene. An acid acceptor, as pyridine, is used to facilitate the reaction. The addition of a hydrogen chloride acceptor in a mole-mole ratio to the reactants was found favorable in assisting the reaction. Any hydrogen chloride acceptor which preferably does not react with the reactants under the reaction conditions used can be employed.

The preparation of the compounds of the present invention may be carried out in accordance with the following non-limiting examples.

EXAMPLE 1

*Preparation of O,O - diethylphosphorodithioylmethyl-methylmercaptoacetate.* — Methylmercaptoacetylchloride (5.6 g., 0.04 mole) was combined with 8.7 g. (0.04 mole) of hydroxymethyl-O,O-diethylphosphorodithioate in 100 ml. of benzene. The mixture was cooled to 5° C. and 3.2 g. (0.04 mole) of pyridine were added at such a rate that the temperature did not exceed 15° C. After the addition was complete, the mixture was stirred at room temperature for one hour. To the reaction mixture was then added 100 ml. of benzene. The mixture was washed with two 100-ml. portions of water. The benzene phase was dried over anhydrous magnesium sulfate and evaporated. There was obtained 10.3 g. (81.9% of theory) of the title compound, $n_D^{30}$ 1.5592.

EXAMPLE 2

*Preparation of O,O-dimethylphosphorodithioyl-methyl-phenylmercaptoacetate.*—Thiophenol (6.6 g., 0.06 mole) was reacted with sufficient 25 percent sodium methoxide solution to adjust the pH to 7. To this was added 13.2 g. (0.05 mole) of O,O-dimethylphosphorodithioylmethyl-chloroacetate in 150 ml. of acetone. The mixture was refluxed for one-half hour. After allowing the mixture to cool, 300 ml. of benzene were added. The organic layer was washed with three 100 ml. portions of water, a 100 ml. solution of 25 percent aqueous sodium hydroxide, followed by two 100 ml. portions of water. The benzene phase was dried with anyhdrous magnesium sulfate and evaporated. The yield was 15.1 g. (89.3% of theory) of the title compound, $n_D^{30}$ 1.5892.

The following is a list of the compounds prepared following the aforedescribed procedures. Compound numbers have been assigned to each compound and are used throughout the balance of the application.

TABLE I

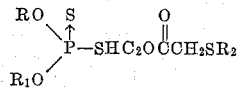

| Compound Number | R | $R_1$ | $R_1$ | $n_D^{30}$ |
|---|---|---|---|---|
| 1* | Ethyl | Ethyl | Methyl | 1.5592 |
| 2 | Methyl | n-Propyl | do | 1.5496 |
| 3* | do | Methyl | Phenyl | 1.5892 |
| 4 | do | do | n-Butyl | 1.5426 |
| 5 | do | do | i-Propyl | 1.5282 |
| 6 | do | do | n-Pentyl | 1.4540 |
| 7 | do | do | i-Pentyl | 1.5150 |
| 8 | do | do | n-Heptyl | 1.4940 |

*No. 1 prepared in Example 1. No. 3 prepared in Example 2.

As previously mentioned, the herein described compositions produced in the above-described manner are biologically active compounds which are useful and valuable in controlling various pest organisms. The compounds of this invention were tested in the following manner.

*Insecticidal evaluation test.*—Three insect species were subjected to evaluation tests for insecticides incorporating the compounds of the present invention.

(1) German cockroach—*Blatella germanica* (Linn.)—(designated GR).

(2) Spotted milkweed bug—*Oncopeltus fasciatus* (Dallas)—(designated MWB).

(3) Housefly—*Musca domestica* (Linn.)—(designated HF).

The test insects were caged in cardboard mailing tubes 3⅛″ in diameter and 2⅝″ tall. The mailing tube cages were supplied with cellophane bottoms and coarse mesh nylon tops. Each cage was provided with food and water. From ten to twenty-five insects were employed per cage. The caged insects were sprayed with the active candidate compound at various concentrations. Final mortality readings were taken after seventy-two hours.

Housefly evaluation tests differed in the following manner. The toxicant was dissolved in a volatile solvent, preferably acetone, the active compound was pipetted into a petri dish bottom, allowed to air dry and placed in a cardboard mailing tube cage. Twenty-five female flies, three to five days old, were caged in the tubes. The flies were continuously exposed to the known residue of the active compound in the cage. After twenty-four and forty-eight hours, counts were made to determine living and dead insects. The LD–50 values were calculated using well-known procedures. The results given in Table II were obtained for the insecticidal evaluation tests herein described.

*Acaricidal evaluation test.*—The two-spotted mite, *Tetranychus telarius* (Linn.), was employed in tests for miticides. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221®, an emulsifying agent, the amount of water being sufficient to give concentrations of active ingredient ranging from 0.25% to 0.005%. The test suspensions were then sprayed on the infested pinto bean plants. After seven days, mortalities of post-embryonic and ovicidal forms were determined. The percentage of kill was determined by comparison with control plants which had not been sprayed with the candidate compounds. The LD–50 value was calculated using well-known procedures. These values are reported under the columns "PE" and "Eggs" in Table II.

*Systemic evaluation test.*—This test evaluates the root absorption and upward translocation of the candidate systemic compound. The two-spotted mite, *Tetranychus telarius* (Linn.), was employed in the test for systemic activity. Young pinto bean plants in the primary leaf stage were used as host plants. The pinto bean plants were placed in bottles containing 200 ml. of the test solution and held in place with cotton plugs. Only the roots were immersed. The solutions were prepared by dissolving the compounds to be tested in a suitable solvent, usually acetone, and then diluting with distilled water. The final acetone concentration never exceeded about 1%. The toxicants were initially tested at a concentration of 10 parts per million (p.p.m.). Immediately after the plants were placed in the test solutions they were infested with mites. Mortalities were determined after seven days. The percentage of kill was determined by comparison with control plants placed in distilled water. The LD–50 values were calculated. The values in p.p.m. are reported in Table II under the column "Systemic."

TABLE II

| Compound Number | Insecticidal Activity | | | Acaricidal Activity Two-spotted mite | | |
|---|---|---|---|---|---|---|
| | HF | GR | MWB | PE | Eggs | Systemic |
| 1 | 25 | .03 | .1 | .01 | .05 | 2 |
| 2 | .1% | | | .03 | | 8 |
| 3 | 25 | .1 | .1 | .03 | | 2 |
| 4 | 25 | .1 | .1 | .005 | | 3 |
| 5 | 50 | .1 | | .01 | | 2 |
| 6 | >.1% | >.1 | >.1 | >.05 | >.05 | 8 |
| 7 | 50 | >.1 | >.1 | .03 | >.05 | 3 |
| 8 | 80 | >.1 | >.1 | .03 | >.05 | >10 |

From these data it can be seen that these new compounds are valuable insecticides and acaricides. They may be used in the form of emulsions, non-aqueous solutions, wettable powders, vapors, dusts, and the like, as may be best fitted to the particular utility. The application to a pest habitat of the compounds of the present invention are well known to those skilled in the art.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A compound of the formula

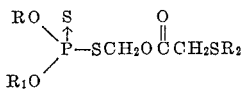

wherein R and $R_1$ are lower alkyl radicals, and $R_2$ is a member selected from the group consisting of alkyl radicals containing from 1 to 8 carbon atoms, inclusive, and phenyl.

2. The compound, O,O-diethylphosphorodithioylmethyl-methylmercaptoacetate.

3. The compound, O-methyl-O-n-propylphosphorodithioylmethyl-methylmercaptoacetate.

4. The compound, O,O-dimethylphosphorodithioylmethyl-phenylmercaptoacetate.

5. The compound, O,O-dimethylphosphorodithioylmethyl-n-butylmercaptoacetate.

6. The compound, O,O-dimethylphosphorodithioylmethyl-n-heptylmercaptoacetate.

References Cited

UNITED STATES PATENTS 3,050,438   8/1962   Vegter et al. _____ 260—948 X

CHARLES B. PARKER, *Primary Examiner.*

A. H. SUTTO, *Examiner.*